United States Patent
Li Vigni et al.

(10) Patent No.: US 7,620,471 B2
(45) Date of Patent: Nov. 17, 2009

(54) METHOD OF MANAGING A SYSTEM FOR THE MANUFACTURE OF TOBACCO PRODUCTS

(75) Inventors: Angelo Li Vigni, Bologna (IT); Maurizio Zanotti, Grizzana Morandi (IT); Danilo Berti, Bologna (IT); Eugenio Sandri, Parma (IT); Paolo Ravelli, Mezzana (IT); Mara Guizzardi, S. Agata Bolognese (IT); Fiorenzo Draghetti, Medicina (IT)

(73) Assignee: G. D S.p.A., Bologna (IT)

( * ) Notice: Subject to any disclaimer, the term of this patent is extended or adjusted under 35 U.S.C. 154(b) by 369 days.

(21) Appl. No.: 10/542,332

(22) PCT Filed: Jan. 13, 2004

(86) PCT No.: PCT/IB2004/000076

§ 371 (c)(1), (2), (4) Date: Jul. 13, 2005

(87) PCT Pub. No.: WO2004/062395

PCT Pub. Date: Jul. 29, 2004

(65) Prior Publication Data

US 2006/0116782 A1 Jun. 1, 2006

(30) Foreign Application Priority Data

Jan. 14, 2003 (IT) .......................... BO2003A0013

(51) Int. Cl.
*G06F 19/00* (2006.01)

(52) U.S. Cl. .......................... 700/117; 700/90; 700/103; 700/112; 131/48; 131/49; 131/50; 131/51

(58) Field of Classification Search .................. 700/90, 700/95, 100, 103, 108, 109, 112, 117; 131/48–51
See application file for complete search history.

(56) References Cited

U.S. PATENT DOCUMENTS

| | | | | |
|---|---|---|---|---|
| 4,827,423 A * | 5/1989 | Beasley et al. | ................. | 700/96 |
| 4,865,179 A * | 9/1989 | Carter et al. | ............. | 198/347.2 |
| 5,063,943 A * | 11/1991 | Wochnowski | .............. | 131/84.4 |
| 6,516,811 B1 * | 2/2003 | Focke et al. | ................. | 131/283 |
| 7,117,871 B2 * | 10/2006 | Hancock et al. | ............... | 131/65 |
| 2002/0094588 A1 | 7/2002 | Fan | | |
| 2002/0107600 A1 * | 8/2002 | Crampton et al. | ........... | 700/100 |
| 2005/0131566 A1 * | 6/2005 | Leuning | ..................... | 700/108 |
| 2005/0145259 A1 * | 7/2005 | Focke et al. | ................. | 131/283 |
| 2007/0051381 A1 * | 3/2007 | Hancock et al. | ............. | 131/284 |

FOREIGN PATENT DOCUMENTS

| | | |
|---|---|---|
| EP | 1041006 | 10/2000 |
| WO | WO0016647 | 3/2000 |

* cited by examiner

*Primary Examiner*—Kidest Bahta
*Assistant Examiner*—Carlos Ortiz Rodriguez
(74) *Attorney, Agent, or Firm*—Timothy J. Klima; Shuttleworth & Ingersoll, PLC

(57) ABSTRACT

A system for manufacturing tobacco products whereby, a number ($P_n$) that represents a nominal production target for products of a given brand, and a number ($C_{max}$) representing the maximum output capacity of the system, or in practice the maximum quantity of products in process that the system is able to handle, are programmed into master control unit (33). A tally (P) of products is kept, and, at a given moment ($t_1$) following the completion of a number ($P_r$) of products that matches the target ($P_n = P_r + C_{max}$), a first flash check is run on the quantity ($C_1$) of the product actually turned out by the system; should it emerge from this first flash check that the actual quantity ($C_1$) is equal to the maximum output capacity ($C_{max}$), then a brand changeover procedure will be initiated by the master control unit (33).

16 Claims, 3 Drawing Sheets

METHOD OF MANAGING A SYSTEM FOR THE MANUFACTURE OF TOBACCO PRODUCTS

This application is the national phase of international application PCT/IB2004/000076 filed Jan. 13, 2004 which designated the U.S. and that international application was published under PCT Article 21(2) in English. This application claims priority to Italian Patent application number BO2003A 000013, filed Jan. 14, 2003.

TECHNICAL FIELD

The present invention relates to a method of managing a system for the manufacture of tobacco products.

BACKGROUND ART

Systems for manufacturing tobacco products will generally comprise a plurality of machines linked one to another along a common production line. In particular, such machines will include a cigarette maker at the upstream end of the line and, arranged in succession proceeding toward the downstream end, a filter tip attachment, a packer, a cellophaner, a cartoner and finally a machine by which pluralities of cartons are parcelled into boxes of whatever type, ready for despatch. Where large boxes are used, the despatch area will be equipped with an end-of-line palletizer.

The system may also comprise a filter plug maker associated with the filter tip attachment, and a number of inline storage units located between the single machines of the system, serving to compensate any differences in operating speed between one machine and the next.

In manufacturing systems of the type in question, each machine needs to be re-supplied periodically with consumables and packaging materials, including tobacco filler, filter plugs, rolls of cigarette paper, metal foil paper and thermoplastic material, packet blanks, coupons, revenue stamps, and so forth. To this end, each machine is equipped with at least one sensor monitoring the depletion of the relative materials, as well as a counter positioned at the outfeed stage of the machine and serving to indicate the number of items turned out.

The demands of the market at the present time are such that individual brands tend to be manufactured in short runs. This means that there are frequent changeover operations, which impact negatively on the long-term productivity of manufacturing systems. With each changeover, in effect, the machines have to be shut down and emptied, and the various consumables replaced entirely or in part.

Conventionally, the task of renewing the supply of consumables to the various machines is carried out by production line operators, relying on an approximate and empirical approach and allowing generous margins of safety so as to ensure the scheduled production target can be reached comfortably, in readiness for changeover to another brand. This results in a measure of overproduction, compared to the original target, and/or the waste of a notable quantity of consumable materials already occupying the production line of the system, which cannot be used in the subsequent run to manufacture tobacco products of a different brand. The operation of removing large quantities of material from the production line and returning these same materials to stock possibly for subsequent use is one that requires a relatively long period of time to complete, and, besides the negative impact on the productivity of the system as already intimated, there is also the risk that the materials could be damaged during handling and transit.

The object of the present invention is to provide a method of managing a system for the manufacture of tobacco products, such as will be unaffected by the drawbacks mentioned above and, more particularly, effective in minimizing the waste of consumables, avoiding damage to consumable materials and limiting overproduction in respect of scheduled targets.

A further object of the invention is to provide a method of managing a system for the manufacture of tobacco products that will be easily implemented and can be run automatically by a monitoring, processing and control system using a limited number of sensing and computing operations.

DISCLOSURE OF THE INVENTION

The stated objects are realized in a method according to the present invention, of which the characterizing features are readily discernible from the content of claim 1 appended and preferably from any one of the claims directly or independently dependent on claim 1.

The invention will now be described in detail, by way of example, with the aid of the accompanying drawings, in which.

Figure 1:
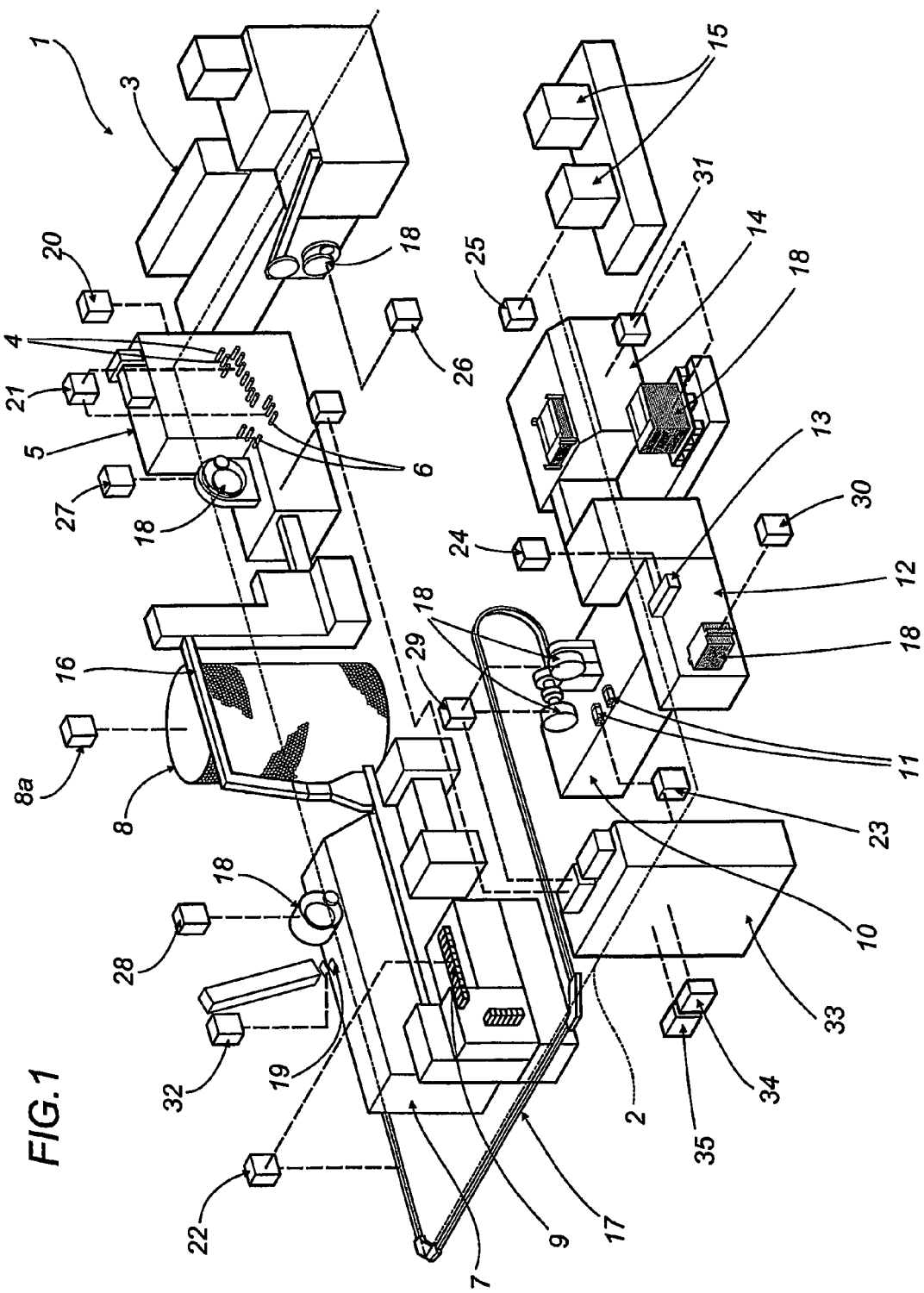
FIG. 1 shows a schematic illustration of a system for the manufacture of tobacco products allowing implementation of the method according to the present invention.

Referring to FIG. 1 of the drawings, 1 denotes a system for the manufacture and packaging of tobacco products, in its entirety, comprising a plurality of machines linked one to another along a production line denoted 2. More exactly, and proceeding from the upstream to the downstream end of the line 2 along the flow path, the system 1 incorporates a cigarette maker 3 turning out cigarette sticks 4, a filter tip attachment 5 turning out filter cigarettes 6, and a packer 5 turning out packets 9 of cigarettes. The packer 7 is connected on the one hand to the filter tip attachment 5, by way of a buffer 8 allowing temporary inline storage of the filter cigarettes 6, and on the other to a cellophaner 10 turning out overwrapped packets 11. The overwrapped packets 11 emerging from the cellophaner 10 are directed into a cartoner 12 by which the selfsame packets 11 are packaged in cartons 13. The cartons are then conveyed into a parceller 14, by which they are packed into boxes 15 of whatever size and style and 9 directed toward an outfeed station of the line 2.

The various machines 3, 5, 7, 10, 12 and 14 are interconnected along the line 2 by means of conveyor devices, of which the conveyor 16 linking the filter tip attachment 5 and the packer 7 and the conveyor 17 linking the packer 7 and the cellophaner 10, in particular, are indicated in FIG. 1.

The line 2 is supplied at points alongside each of the machines 3, 5, 7, 10, 12 and 14 with respective wrapping materials, all denoted 18 and consisting in rolls of paper, metal foil and polypropylene, cardboard blanks and the like. Also supplied to the line 2 are additional and/or auxiliary materials such as coupons and revenue stamps, denoted 19 generically in FIG. 1.

Associated with each of the machines 3, 5, 7, 10, 12 and 14, and indicated by relative blocks, are respective counters such as will generate a signal indicating the number of products turned out by each machine 3, 5, 7, 10, 12 and 14. In particular, two counters denoted 20 and 21 are associated with the machines 3 and 5 producing the cigarette sticks 4 and filter cigarettes 6, respectively; two counters 22 and 23 are associated respectively with the packer 7 and the cellophaner 10, serving to keep a tally of erected packets 9 and overwrapped packets 11; and two further counters 24 and 25 associated with the cartoner 12 and the parceller 14 serve respectively to keep a tally of the cartons 13 and of the filled boxes 15 at the aforementioned outfeed station.

Also forming part of the system, and illustrated by relative blocks, are sensors able to generate a signal indicating the consumption of the wrapping materials 18 and the additional and/or auxiliary materials 19 utilized by the corresponding machine during its operation. In particular, sensors 26 and 27 associated respectively with the cigarette maker 3 and with the filter tip attachment 5 serve to monitor the consumption of the rolls 18 of paper material used to make the cigarette sticks 4 and the filter cigarettes 6, respectively; similarly, sensors 28, 29, 30 and 31 associated with the packer 7, the cellophaner 10, the cartoner 12 and the parceller 14 serve to monitor the consumption of the materials 18 used by these same machines, typically rolls, blanks and the like. In addition, a counter 32 associated with the packer 7 will generate a signal indicating the number of revenue stamps or coupons 19 used by this same machine 7.

A sensor 8a associated with the cigarette buffer 8 serves to generate a signal indicating the number of cigarettes 6 occupying the buffer.

The counters 20, 21, 22, 23, 24, 25 and 32 and the sensors 8a, 26, 27, 28, 29, 30 and 31 are connected on the output side to a master control unit 33 which in turn is connected in conventional manner, not illustrated, to the internal control units of the single machines making up the system 1.

The connections between the single counters and sensors and the control unit 33 are not illustrated in FIG. 1.

The master control unit 33 is able to store and process data received from the counters and sensors.

Also connected to the master control unit 33 are a terminal device 34 by way of which to preset a nominal target number $P_n$ of products, for example boxes 15, to be turned out by the system 1 during a given production run, and a terminal device 35 by way of which to preset a constant factor $C_{max}$ indicating the maximum output capacity of the system 1, that is to say its maximum capability, in terms of the maximum quantity of products in process that the system can accommodate.

Factor $C_{max}$ is a number that will be dependent on the type of machines making up the system, and in particular their capacity to store finished products or products in process temporarily, on the length and capacity of the conveyors used in the system, and on the maximum capacity of buffers or other inline storage facilities installed. The value of $C_{max}$ can be expressed as a number of cigarettes, that is to say elementary products, or alternatively, according to respective conversion factors that will be constant and predetermined for each brand of products, as a number of packets, cartons or boxes. For whatever system and for any given brand of products, at all events, factor $C_{max}$ remains a constant.

The method of managing the system 1 according to the present invention involves counting the number P of at least one among the aforementioned products turned out by one of the machines. In particular, the number P of boxes 15 turned out by the parceller 14 is monitored by the relative counter 25, which relays a corresponding signal to the master control unit 33.

At a given moment $t_1$ when the number of products P equals a reference value $P_r$ such that the master control unit 33 recognizes a match between the aforementioned target number $P_n$ of boxes 15 and the sum of the number $P_r$ of boxes 15 already packaged plus the value $C_{max}$ indicating the maximum number of boxes 15 the system 1 is able to produce, in other words when $P_n=P_r+C_{max}$, the master control unit 33 runs a first flash check on the actual quantity $C_1$ of products 15 turned out by the system 1.

The flash check run by the master control unit 33 consists in comparing the value of quantity $C_1$ registering at moment $t_1$ with the aforementioned constant factor $C_{max}$, so it can establish what action needs to be applied to the system 1 on the basis of the comparison. The procedure in question will now be described with reference to FIG. 2.

Figure 2:
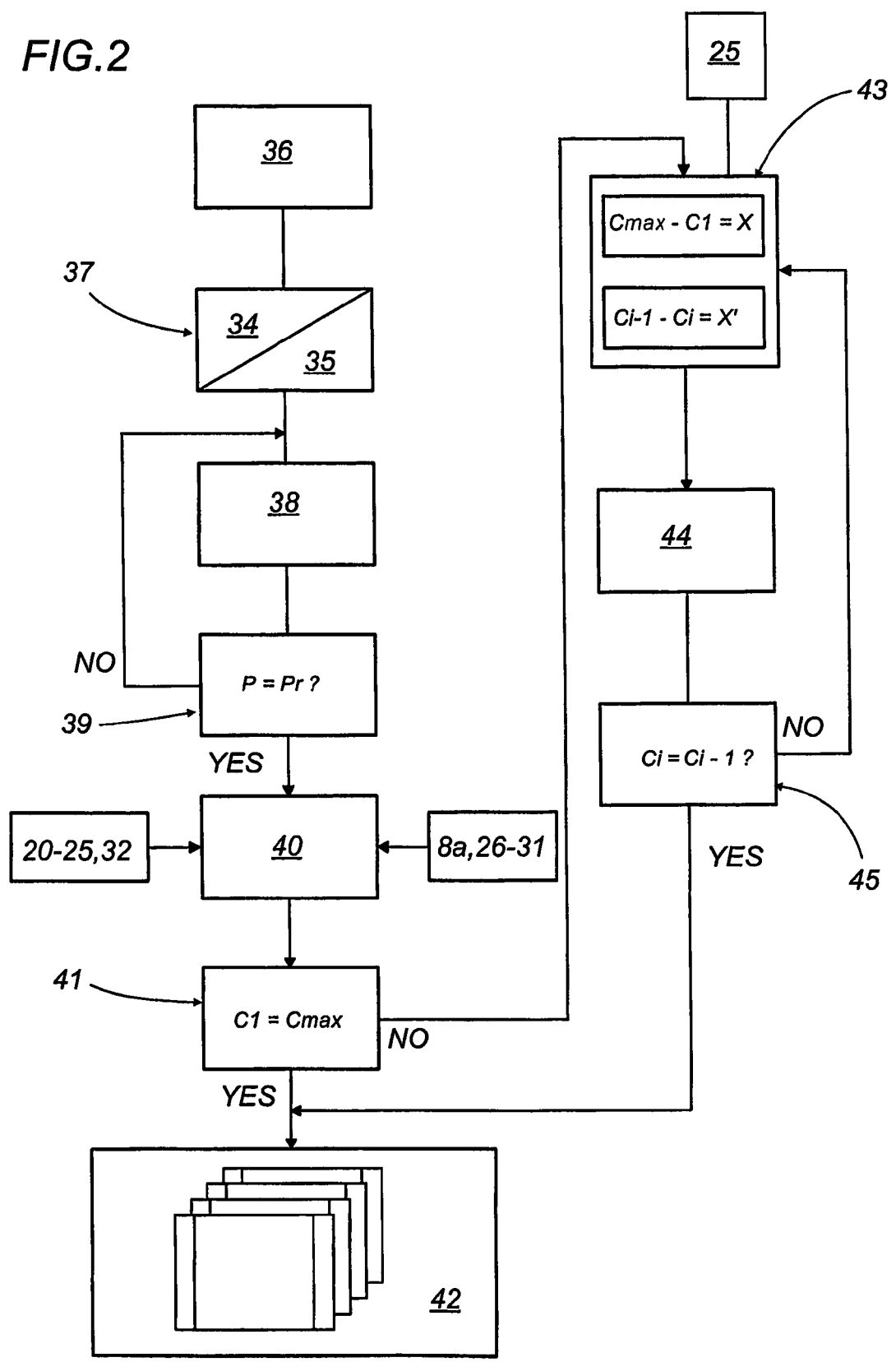
FIG. 2 is a block diagram showing a first preferred procedure for implementation of the method of managing and controlling the system illustrated in FIG. 1.

Referring to the block diagram of FIG. 2, the master control unit 33 will execute the following sequence of steps, of which the first step, or start, is indicated by a block denoted 36.

The start block 36 is followed by a block 37 that indicates both the step of presetting the target number $P_n$ of boxes 15 by way of the device denoted 34 in FIG. 1, and the step of presetting a value $C_{max}$ representative of the maximum quantity of boxes 15 the system is able to produce, by way of the device denoted 35 in FIG. 1.

The presetting block 37 is a followed by a block 38 that indicates the step of counting the number P of products turned out by the single machines 3, 5, 7, 10, 12 and 14, and in particular, to reiterate, the number of boxes 15 turned out by the parceller 14, the last machine of the line 2.

The counting block 38 is followed by a comparison block 39 that indicates the step of verifying a condition of parity between the number P and the value $P_n=P_r+C_{max}$. It will be observed that, like $P_n$ and $C_{max}$, $P_r$ is also a predetermined constant.

At the moment $t_1$ when P matches $P_r$ and the condition $P_n=P_r+C_{max}$ is satisfied, a control signal will be relayed from the comparison block 39 by way of the YES route to a successive monitoring block 40 which is in receipt of input signals from the counters 20, 21, 22, 23, 24, 25 and 32 and the sensors 8a, 26, 27, 28, 29, 30 and 31, of which the outputs are connected to the master control unit 33, and capable of running the first flash check on the basis of the input data to verify the actual quantity $C_1$ of boxes 15 turned out by the system 1 at the predetermined moment $t_1$.

It will be observed that a signal returned via the NO route from the comparison block 39 indicates that no control response is triggered, deferring the flash check as long as value P remains less than $P_r$.

On receiving the control signal from the comparison block 39, the monitoring block 40 relays a signal indicating the actual quantity $C_1$ of products to a second comparison block 41, which compares this quantity $C_1$ with the preset quantity $C_{max}$ so it can establish what action needs to be applied to the system 1 on the basis of the comparison.

In the event that the value $C_1$ registering at moment $t_1$ is substantially the same as value $C_{max}$, a signal is relayed via the YES route to a block denoted 42, instructing preparation and initiation of the procedure for changeover to another brand of tobacco products. The procedure in question may be confined to a single machine, the cigarette maker 3 for example, and concerned in particular with the operation of emptying this same machine, or it might also cover the other machines of the system 1.

In the event that the value $C_1$ registering at moment $t_1$ is less than the value $C_{max}$, no signal is relayed to the changeover block 42, whereas a signal is returned via a NO route to an event generator block denoted 43 located externally of the master control unit 33, indicating the difference between value $C_{max}$ and value $C_1$ measured at moment $t_1$.

Assuming the difference in question corresponds to a given number of cartons 15, say X, then at the moment $t_2$ when the counter 25 associated with the outfeed of the parceller 14 gives a tally of boxes 15 corresponding to $P_r+X$, the event generator block 43 will relay a control signal to a further monitoring block 44 instructing a second flash check of the actual quantity $C_2$ of boxes 15 turned out by the system 1 at the second moment $t_2$. On receiving the signal from the event generator block 43, the monitoring block 43 relays a signal indicating the actual quantity $C_2$ of products to a further comparator block 45, which proceeds to compare this value $C_2$ with the previous value $C_1$.

Should it emerge from this comparison that $C_2$ is equal to $C_1$, a signal is relayed by the comparator block 45 via the YES route to the changeover block 42, instructing preparation and initiation of the procedure for the switch to another brand of products. Conversely, if $C_2$ is less than $C_1$, a signal is returned by the comparator block 45 to the event generator block 43, via the NO route, indicating the difference X' between value $C_1$ and value $C_2$.

At the moment $t_3$ when the counter 25 associated with the outfeed of the parceller 14 gives a tally of boxes 15 corresponding to $P_r+X+X'$, the event generator 43 will relay a control signal to the monitoring block 44 instructing a third flash check of the actual quantity $C_3$ of boxes 15 turned out by the system 1 at the third moment $t_3$.

The steps of the method are repeated, and the flash checks will continue until the comparison produces a match expressed as $C_i=C_{i-1}$, where $i=2, 3 \ldots$, which signifies that the target number $P_n$ has been reached.

It will be appreciated that in order to avoid overproduction, $C_i$ must never be greater than $C_{i-1}$. This can be ensured simply by piloting the system 1 to respond, with effect from the first flash check, by emptying the buffer 8 at least in part, and more generally by depleting all reserves of materials at the various machines, during the interval between generic moments $t_i$ and $t_{i-1}$.

Similarly, it will be noted that the method of management described above uses a non-programmed, event-controlled type of loop where the single events are the consequence of measuring output numbers P equivalent respectively, starting from the first event, to $P_r$, $P_r+X$, $P_r+X+X'$, etc.

It has been found by experiment that the procedure can be concluded with a minimal number of flash checks, for example two or three.

The objects stated at the outset are thus realized with the method described above, in that consumable materials can be organized so as to minimize waste and avoid damage, and overproduction reduced to minimal levels, by virtue of a logic that is simple to implement and can be run automatically by a monitoring, processing and control system using a limited number of sensing and computing operations.

Figure 3:
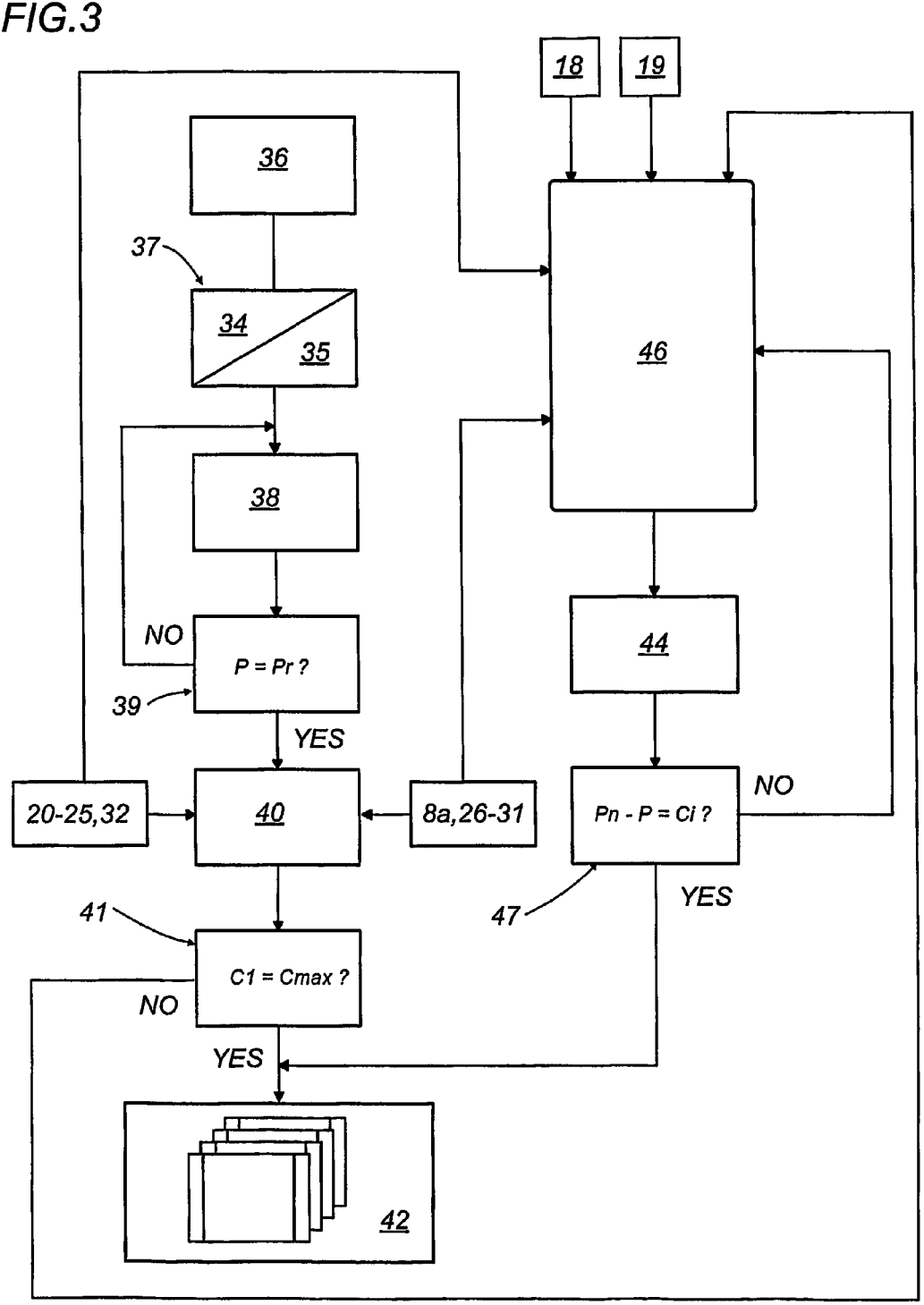
FIG. 3 is a block diagram showing a second procedure for implementation of the method of managing and controlling the system illustrated in FIG. 1.

In a variation on the method described above, illustrated in particular by the block diagram of FIG. 3, the single events are dictated by the value of output numbers P which, starting from the first event, will be compared with thresholds expressed respectively as $P_r$, $P_r+1$, $P_r+2$, etc. In other words, the production threshold that determines the first event corresponds to $P_r=P_n-C_{max}$ and each threshold determining a successive event is obtained by applying a unitary increment of the previous threshold.

In accordance with the principle already mentioned, the flash checks occur at moments $t_1, t_2, t_3 \ldots$ that are not programmed, but rather dependent on the production thresholds of one of the products turned out by one of the machines 3, 5, 7, 10, 12 and 14 making up the system 1. It might be advantageous, for example, to monitor the cigarette maker 3 and consider the unitary increment in output from the machine as a further number of cigarettes equivalent to the contents of one box 15.

To this end, the unitary increments in output from the cigarette maker 3 will be constants typical of the brand in production.

Likewise in this instance it has been found by experiment that the procedure can be concluded with a minimal number of flash checks, for example two or three.

The block diagram of FIG. 3 differs from the block diagram of FIG. 2 essentially in that the event generator denoted 43 is replaced by a different event generator denoted 46, again separate from the master control unit 33.

As illustrated in FIG. 3 and described previously with reference to FIG. 2, as soon as P equals $P_r$, the monitoring block 40 will receive a control signal from the first comparator block 39 and direct a signal indicating the actual quantity $C_1$ of products to the second comparator block 41, which in turn measures this value $C_1$ against the preset value $C_{max}$ indicating the maximum capacity of the system so as to establish what action needs to be applied on the basis of the comparison.

In the event that the value $C_1$ registering at moment $t_1$ is substantially the same as value $C_{max}$, a signal will be relayed via the YES route to the changeover block 42 instructing preparation and initiation of the procedure for a switch to another brand of tobacco products.

In the event that the value $C_1$ registering at moment $t_1$ is less than the value $C_{max}$, no signal is relayed to the changeover block 42, whereas a signal will be returned via a NO route to the event generator block 46 enabling the generation of events subsequent to the first.

At the moment $t_2$ when the counter 20 associated with the cigarette maker 3 registers an incremental number of cigarettes 4 equivalent to the contents of one box 15, hence $P=P_r+1$, the event generator block 46 relays a control signal to the monitoring block 44 ordering a second flash check of the actual quantity $C_2$ of boxes turned out by the system 1 at the second moment $t_2$.

The signal corresponding to value $C_2$ is sent to a comparator block 47 which measures this same value $C_2$ against a value indicating the difference between $P_n$ and the number $P=P_r+1$ of boxes turned out up to moment $t_2$.

If the values match, a signal will be relayed by the comparator block 47 via the YES route to -the changeover block 42 instructing preparation and initiation of the procedure for a switch to another brand of tobacco products. If not, then a signal will be returned by the comparator block 47 to the event generator block 46, via the NO route, enabling the generation of events subsequent to the second.

The steps of the method are repeated until the comparisons produce a match expressed as $P_n-P=C_i$, where $i=2, 3 \ldots$.

It will be seen that the moments $t_1, t_2, t_3 \ldots$ at which flash checks are run could also be dependent on the consumption thresholds for any one of the wrapping materials 18 or any one of the additional and/or auxiliary materials 19, for example the revenue stamps.

In all of the cases illustrated by way of example, moreover, the method disclosed could include the further step of establishing production thresholds for at least one of the products turned out by a given machine 3, 5, 7, 10, 12 or 14 operating in the system on the basis of a correction factor determined by statistical and/or experimental events. The step of defining a production threshold on the basis of a correction factor will take place following the last of a plurality of successive flash checks to measure the actual quantities of products turned out by the system 1.

The invention claimed is:

1. A method of managing a system for the manufacture of tobacco products comprising a plurality of machines, turning out products comprising at least one of cigarettes, packets, cartons, overwrapped packets, overwrapped cartons, packs and boxes, wherein the machines of the system can be supplied respectively with at least one of wrapping materials, additional materials and auxiliary materials, comprising:

programming a number (Pn) into a master control unit representing a nominal production target for at least one predetermined product among those turned out by the machines of the system;

programming a value (Cmax) into the master control unit, representing a maximum holding capacity of the system from start to finish, expressed as a quantity of the predetermined product;

counting a number (P) of at least one of products emerging from a relative machine of the system and relaying a corresponding item of data to the master control unit;

running a first check on an actual quantity (C1) of the predetermined product turned out by the system, at a moment (t1) when the number (P) of emerging products equals a value (Pr) that will result in a match (Pn=Pr+Cmax) between the nominal production target (Pn) for the predetermined product and the sum of a number (Pr) of products turned out plus a value (Cmax) indicating the maximum holding capacity of the system, the actual quantity (C1) expressing a real number of products in making in the system, such number indicating the actual quantity (C1) being obtained by at least one of controlling and counting at least one countable parameter necessary for carrying out the tobacco manufacturing;

comparing the value of the actual quantity (C1) registering at the first check with the value (Cmax) indicating the maximum holding capacity of the system, in order to establish what action should be applied to the system on the basis of the comparison;

initiating a procedure for changeover to another brand of tobacco products in an event that the actual quantity (C1) of products registering at the moment of the first check is substantially equal to the value (Cmax) indicating the maximum holding capacity of the system; wherein checks are run at moments depending on respective production thresholds programmed for one of the products turned out by a given machine of the system.

2. A method as in claim 1, comprising a further step of running at least a second check on the actual quantity (C2, C3 . . . ) of the predetermined product turned out, in an event that the value of the actual quantity (C1) of products registering at the moment of the first check is less than the value (Cmax) indicating the maximum holding capacity of the system.

3. A method as in claim 2, wherein the second check on the actual quantity ($C_2$) of the predetermined product turned out is run at a moment ($t_2$) established according to the difference between the value ($C_{max}$) indicating the maximum holding capacity of the system and the value of the actual quantity ($C_1$) measured at the moment ($t_1$) of the first check.

4. A method as in claim 3, comprising the-further steps of running a plurality of checks subsequent to the second check on the actual quantity ($C_3$, $C_4$ . . . ) of the predetermined product turned out, wherein each check from the second onwards will determine a moment of running a next check, according to a difference between the value ($C_{i-1}$) corresponding to the output quantity measured at a previous check and the value ($C_i$) corresponding to the actual quantity measured at the current moment.

5. A method as in claim 1, wherein the production thresholds are referable to any one of the machines making up the system, and each threshold comprises a number of relative products equal to or constituting a multiple of a number of products constituting an end product.

6. A method as in claim 1, wherein the production thresholds are referable to the final machine of the system.

7. A method as in claim 6, wherein the procedure for changing over to another brand of tobacco product is initiated when, following the steps of running a plurality of successive checks on output quantities (C2, . . . Ci, . . . ) subsequent to the actual quantity (C1) measured at the moment (t1) of the first check, there is a match (Pn−P=Ci) between a value given by the production target (Pn) for at least one predetermined product among the products turned out by the machines less the number (P) of at least one of the products turned out by the corresponding machine of the system, and the value of the actual quantity (C1) measured at a corresponding moment (ti) of running the check.

8. A method as in claim 7, wherein checks are run at moments depending on consumption thresholds for at least one of the wrapping materials, the additional materials and the auxiliary materials used by at least one predetermined machine of the system.

9. A method as in claim 6, comprising a further step of establishing production thresholds for at least one of the products, turned out by a given machine of the system, based on a correction factor determined by at least one of statistical and experimental events.

10. A method as in claim 9, wherein the step of establishing the production threshold on the basis of a correction factor takes place following a last of a plurality of successive checks to measure the actual quantities of products turned out.

11. A method as in claim 2, wherein the procedure for changing over to another brand of tobacco product is initiated when, following the steps of running a plurality of successive checks on output quantities (C2, . . . Ci, . . . ) subsequent to the actual quantity (C1) measured at the moment (t1) of the first check, there is a match (Pn−P=Ci) between a value given by the production target (Pn) for at least one predetermined product among the products turned out by the machines less the number (P) of at least one of the products turned out by the corresponding machine of the system, and the value of the actual quantity (C1) measured at a corresponding moment (ti) of running the check.

12. A method as in claim 1, wherein checks are run at moments depending on the consumption thresholds for at least one of the wrapping materials, the additional materials and the auxiliary materials used by at least one predetermined machine of the system.

13. A method as in claim 1, comprising a further step of establishing production thresholds for at least one of the products, turned out by a given machine of the system, based on a correction factor determined by at least one of statistical and experimental events.

14. A method as in claim 3, wherein the procedure for changing over to another brand of tobacco product is initiated when, following the steps of running a plurality of successive checks on output quantities (C2, . . . Ci, . . . ) subsequent to the actual quantity (C1) measured at the moment (t1) of the first check, there is a match (Pn−P=Ci) between a value given by the production target (Pn) for at least one predetermined product among the products turned out by the machines less the number (P) of at least one of the products turned out by the corresponding machine of the system, and the value of the actual quantity (C1) measured at a corresponding moment (ti) of running the check.

15. A method of managing a system for the manufacture of tobacco products comprising a plurality of machines, turning out products comprising at least one of cigarettes, packets, cartons, overwrapped packets, overwrapped cartons, packs and boxes, wherein the machines of the system can be supplied respectively with at least one of wrapping materials, additional materials and materials, comprising:

programming a number (Pn) into a master control unit representing a nominal production target for at least one predetermined product among those turned out by the machines of the system;

programming a value (Cmax) into the master control unit, representing a maximum holding capacity of the system from start to finish, expressed as a quantity of the predetermined product;

counting a number (P) of at least one of products emerging from a relative machine of the system and relaying a corresponding item of data to the master control unit;

running a first check on an actual quantity (C1) of the predetermined product turned out by the system, at a moment (t1) when the number (P) of emerging products equals a value (Pr) that will result in a match (Pn=Pr+Cmax) between the nominal production target (Pn) for the predetermined product and the sum of a number (Pr) of products turned out plus a value (Cmax) indicating the maximum holding capacity of the system, the actual quantity (C1) expressing a real number of products in making in the system, such number indicating the actual quantity (C1) being obtained by at least one of controlling and counting at least one countable parameter necessary for carrying out the tobacco manufacturing;

comparing the value of the actual quantity (C1) registering at the first check with the value (Cmax) indicating the maximum holding capacity of the system, in order to establish what action should be applied to the system on the basis of the comparison;

running at least a second check on the actual quantity (C2, C3 . . . ) of the predetermined product turned out in an event that the value of the actual quantity (C1) of products registering at the moment of the first check is less than the value (Cmax) indicating the maximum holding capacity of the system; wherein checks are run at moments depending on respective production thresholds programmed for one of the products turned out by a given machine of the system.

16. A method of managing a system for the manufacture of tobacco products comprising a plurality of machines, turning out products comprising at least one of cigarettes, packets, cartons, overwrapped packets, overwrapped cartons, packs and boxes, wherein the machines of the system can be supplied respectively with at least one of wrapping materials, additional materials and auxiliary materials, comprising:

programming a number (Pn) into a master control unit, representing a nominal production target for at least one predetermined product among those turned out by the machines of the system;

programming a value (Cmax) into the master control unit representing a maximum holding capacity of the system from start to finish, expressed as a quantity of the predetermined product;

counting a number (P) of at least one of products emerging from a relative machine of the system and relaying a corresponding item of data to the master control unit;

running a first check on an actual quantity (C1) of the predetermined product turned out by the system, at a moment (t1) when the number (P) of emerging products equals a value (Pr) that will result in a match (Pn=Pr+Cmax) between the nominal production target (Pn) for the predetermined product and the sum of a number (Pr) of products turned out plus a value (Cmax) indicating the maximum holding capacity of the system, the actual quantity (C1) expressing a real number of products in making in the system, such number indicating the actual quantity (C1) being obtained by at least one of controlling and counting at least one countable parameter necessary for carrying out the tobacco manufacturing;

comparing the value of the actual quantity (C1) registering at the first check with the value (Cmax) indicating the maximum holding capacity of the system, in order to establish what action should be applied to the system on the basis of the comparison;

initiating a procedure for changeover to another brand of tobacco products in an event that the actual quantity (C1) of products registering at the moment of the first check is substantially equal to the value (Cmax) indicating the maximum holding capacity of the system; wherein checks are run at moments depending on a consumption thresholds for at least one of the wrapping materials, the additional materials and the auxiliary materials used by at least one predetermined machine of the system.

* * * * *